(12) United States Patent
Todorovic

(10) Patent No.: US 8,678,319 B2
(45) Date of Patent: Mar. 25, 2014

(54) DE-ICING DEVICE OF AN AIRCRAFT GAS-TURBINE ENGINE

(75) Inventor: Predrag Todorovic, Berlin (DE)

(73) Assignee: Rolls-Royce Deutschland Ltd & Co KG (DE)

( * ) Notice: Subject to any disclaimer, the term of this patent is extended or adjusted under 35 U.S.C. 154(b) by 16 days.

(21) Appl. No.: 13/478,261

(22) Filed: May 23, 2012

(65) Prior Publication Data

US 2012/0298802 A1 Nov. 29, 2012

(30) Foreign Application Priority Data

May 24, 2011 (DE) .......................... 10 2011 102 458

(51) Int. Cl.
*B64D 15/04* (2006.01)

(52) U.S. Cl.
USPC ................................... 244/134 B; 244/134 R

(58) Field of Classification Search
USPC ................. 244/134 B, 134 R, 53 B, 207–209
See application file for complete search history.

(56) References Cited

U.S. PATENT DOCUMENTS

| | | | |
|---|---|---|---|
| 2,592,118 A * | 4/1952 | Chillson et al. | ........... 244/134 R |
| 3,571,896 A * | 3/1971 | Wilkerson | ....................... 29/237 |
| 3,576,329 A * | 4/1971 | Weaver | .......................... 277/616 |
| 4,448,754 A * | 5/1984 | Isogai et al. | ................... 422/179 |
| 5,011,098 A | 4/1991 | McLaren et al. | |
| 5,700,011 A * | 12/1997 | Bainachi et al. | ............... 277/422 |
| 6,079,670 A | 6/2000 | Porte | |
| 2002/0027180 A1* | 3/2002 | Porte et al. | ................ 244/134 R |
| 2007/0152444 A1* | 7/2007 | Kertesz et al. | ................ 285/406 |
| 2009/0152401 A1 | 6/2009 | Sternberger | |

FOREIGN PATENT DOCUMENTS

| | | |
|---|---|---|
| EP | 0376371 | 7/1990 |
| GB | 2259679 | 3/1993 |

OTHER PUBLICATIONS

German Search Report dated Jan. 26, 2012 from counterpart application.
German Search Report dated Sep. 20, 2012 from counterpart application.

* cited by examiner

*Primary Examiner* — Tien Dinh
*Assistant Examiner* — Jessica Wong
(74) *Attorney, Agent, or Firm* — Timothy J. Klima; Shuttleworth & Ingersoll, PLC

(57) ABSTRACT

The present invention relates to a de-icing device of an aircraft gas-turbine engine with an engine cowling enclosing at least one inflow region, with the engine cowling having a double-walled design and including at least one annular tube element extending in the circumferential direction and being provided with outlet openings for passing hot air to an inflow region, in order to de-ice it, with the tube element in the circumferential direction including multiple individual tube segments which can be attached relative to one another.

13 Claims, 4 Drawing Sheets

DE-ICING DEVICE OF AN AIRCRAFT GAS-TURBINE ENGINE

Figure 1:
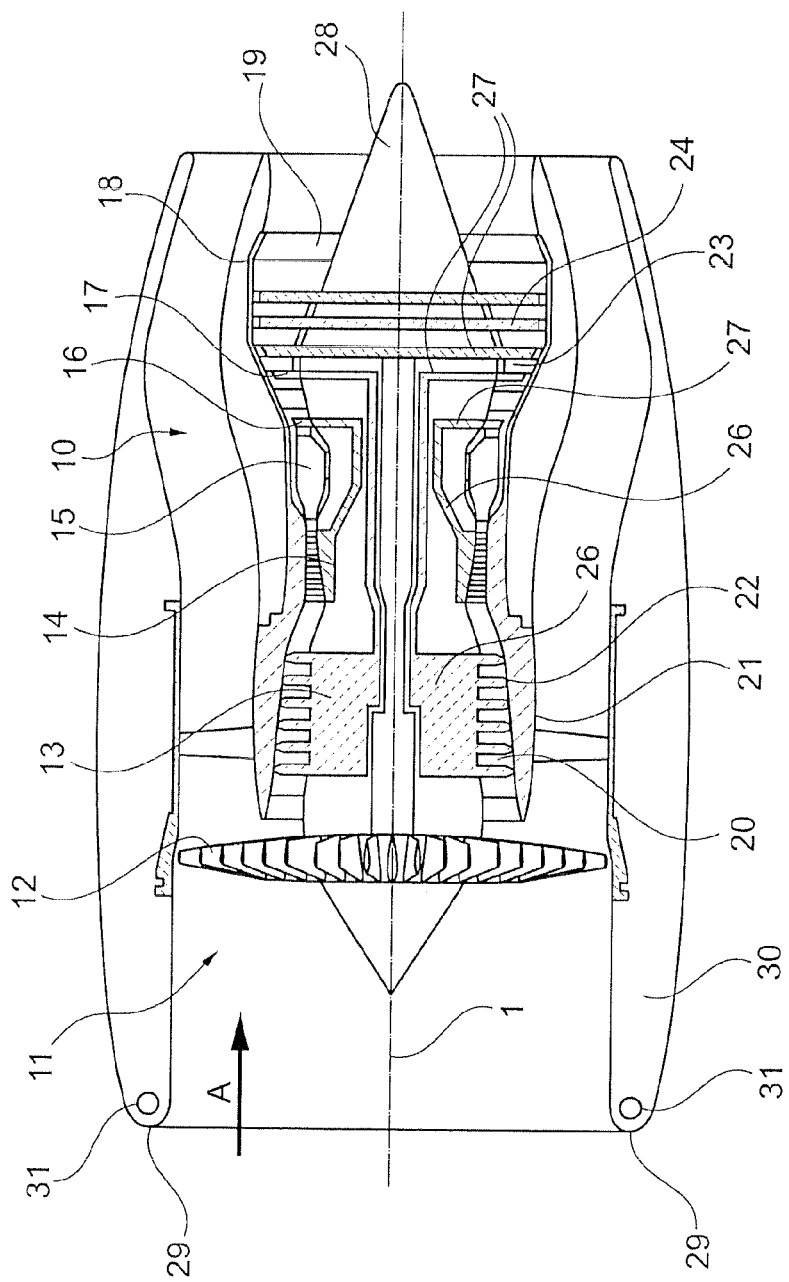

This application claims priority to German Patent Application DE102011102458.5 filed May 24, 2011, the entirety of which is incorporated by reference herein.

BACKGROUND

This invention relates to a de-icing device of an aircraft gas-turbine engine.

More particularly, the invention relates to a de-icing device arranged in an engine cowling in the inflow region of the latter.

It is known from the state of the art to attach an annular tube element within a double-walled inflow region of an engine cowling adjacent to an inflow region or an annular lip, into which tube element hot air is introduced which escapes through outlet openings of the tube element, thereby heating the wall of the annular lip from the inside (piccolo tube de-icing principle).

Due to its design, an annular tube element of this type has a very large diameter. In combination with the wide variations in temperature involved during the operation of an aircraft gas turbine, this leads to strong thermal expansions and contractions, resulting in high thermal stresses. These thermal stresses not only affect the annular tube element itself, but also its support. For this reason, the state of the art, as for instance in U.S. Pat. No. 6,079,670, employs very elaborate measures to support the tube element in such a way that the support is not damaged by the thermal expansions or contractions, respectively. This all results in high manufacturing costs and in an overall construction of significant weight, and contributes to malfunctions due to component failure, such as wear, which entails extensive servicing and inspection work.

DETAILED DESCRIPTION

A broad aspect of the present invention is to provide a de-icing device of the type specified at the beginning which, while being simply designed and easily and cost-effectively producible, avoids the disadvantages of the state of the art and can be provided with a simple support.

It is a particular object of the present invention to provide solution to the above problems by a combination of the features of described herein. Further advantageous embodiments of the present invention become apparent from the present description.

It is thus provided in accordance with the invention that the tube element, in the circumferential direction, includes multiple individual tube segments that can be moved relative to one another like a telescope (telescopic principle).

By dividing the tube element into individual tube segments, it is possible to compensate for thermal expansions or contractions at the transition points between the individual tube elements. The tube elements thus move relative to one another as they expand or contract, without this resulting in the application of forces to the actual support of the tube element. The support can thus be designed in a simple, cost-effective way, not subject to thermal influences. In this way, the radial movement that occurs in the state of the art is replaced by movements between the individual tube segments (telescopic principle).

Due to the relative movement between the individual tube segments, the overall system is largely maintenance-free, has a long expected service life, and is not susceptible to stress cracking or similar damage.

The movability of the individual tube segments with respect to one another is favourably achieved using plug-type connectors by means of which the individual tube segments are coupled to one another. Since the hot air that is supplied escapes through recesses in the tube segments, it is not necessary for the plug-type connectors to be tightly sealed; instead, it is acceptable for a small amount of hot air to escape in the region of the plug-type connectors.

The plug-type connectors are favourably sealed from one another by sliding gaskets. In a preferred embodiment, sliding gaskets of this type are annularly shaped, and allow not only the movement of the individual tube segments relative to one another in the axial direction, but also tilting or other movements in the radial direction, which also result from thermally induced changes in the diameter of the individual tube segments.

It is particularly favourable in accordance with the invention for the tube segments each to be mounted centrally with respect to their extent in the circumferential direction. This mounting is favourably accomplished by one mounting support each (fixed mounting block), which can be permanently fixed to the tube segment. No thermally induced forces arise at the transition region between the mounting support and the tube segment, which means that the mounting support proper can be designed in a simple manner.

Figure 2:
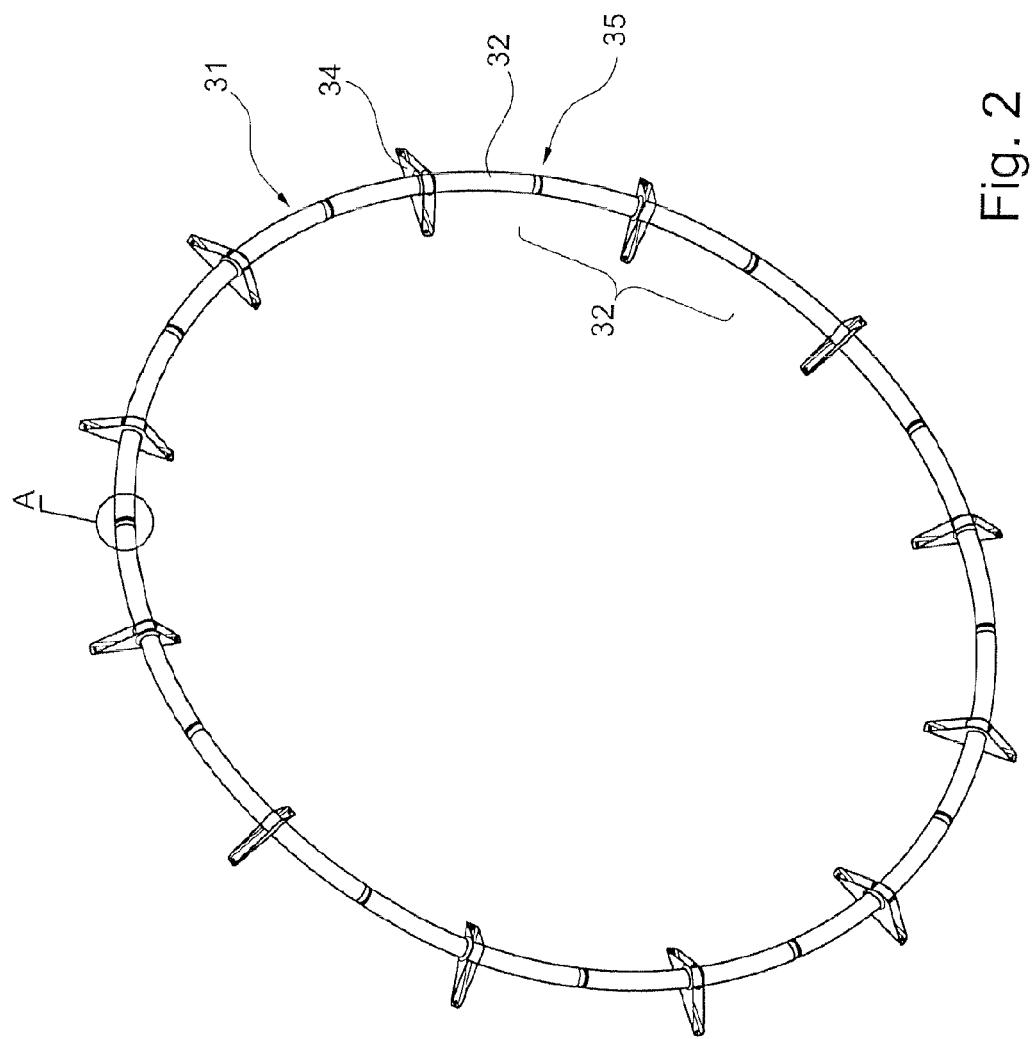
Figure 3:
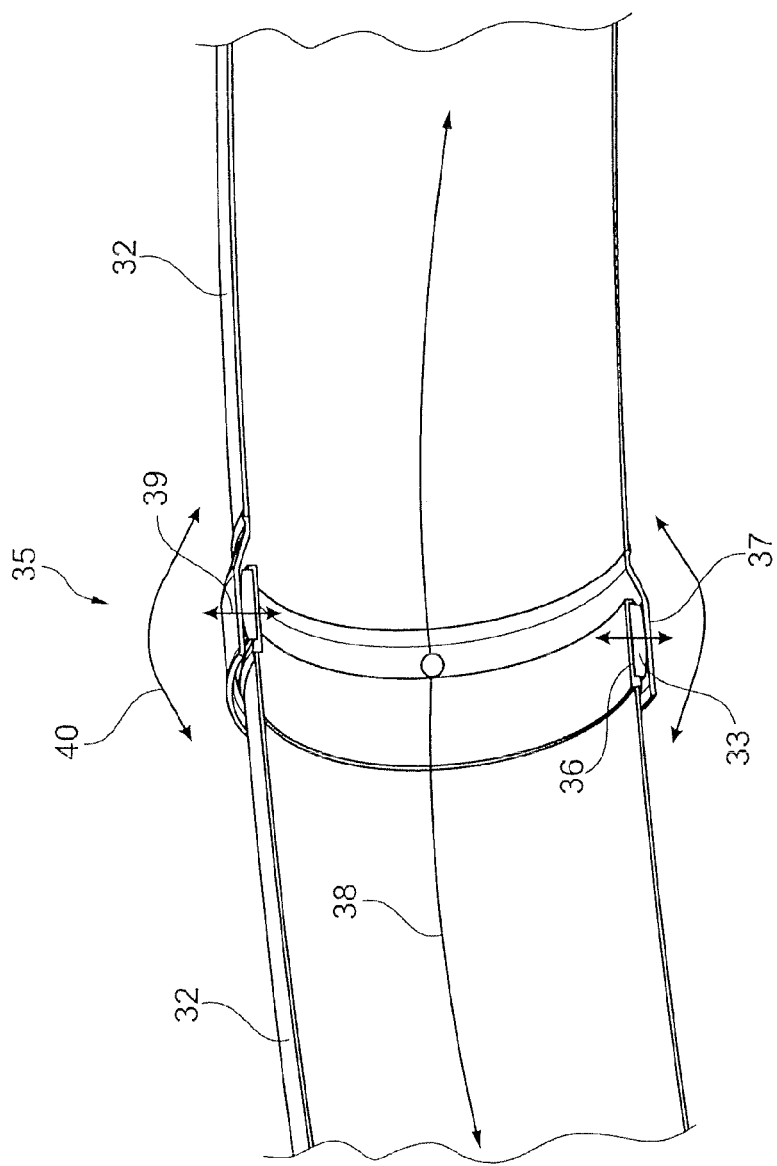
Figure 4:
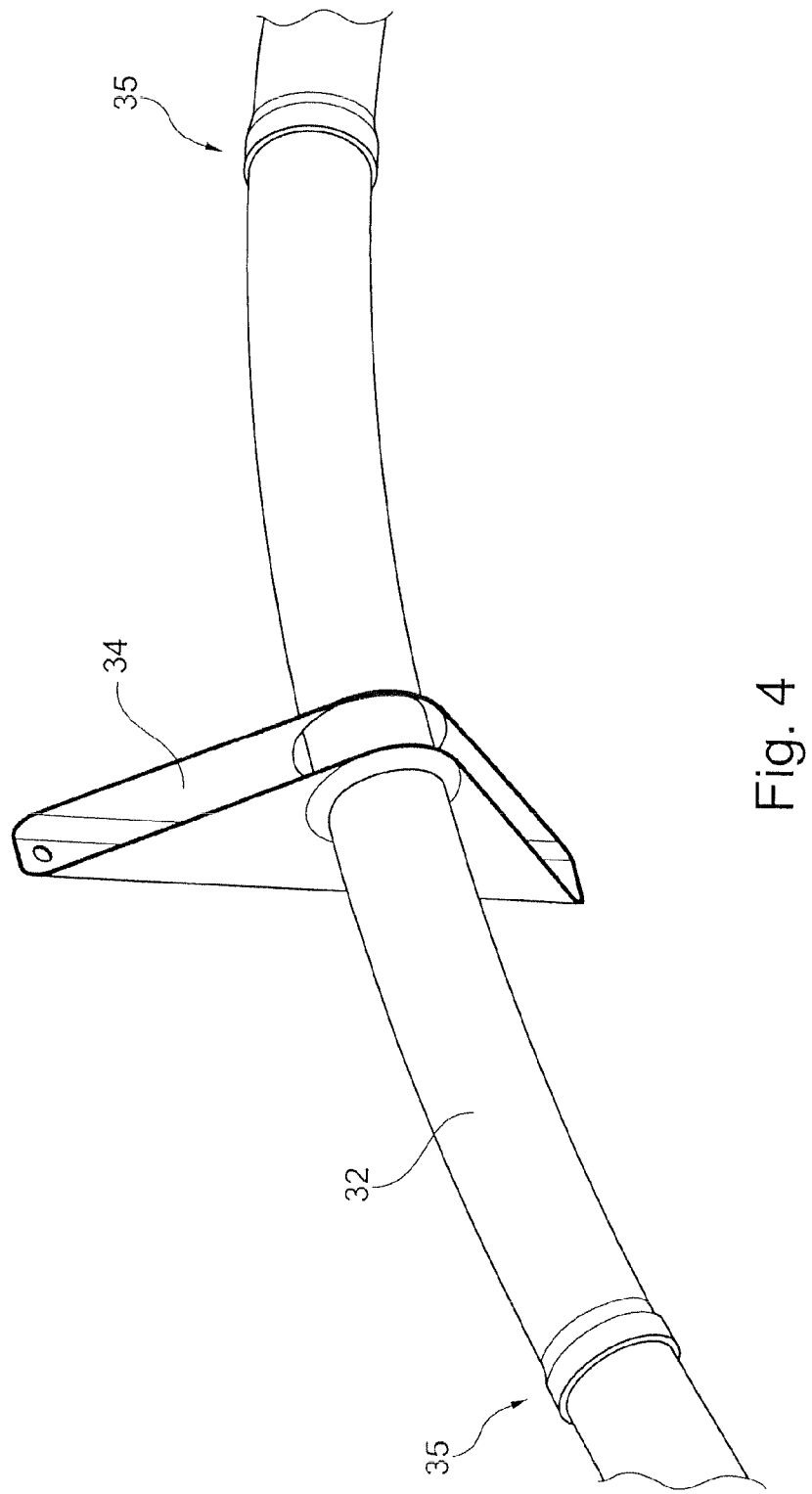

The present invention is described in the following in light of the accompanying drawing, showing an exemplary embodiment. In the drawing, FIG. 1 shows a schematic representation of a gas-turbine engine in accordance with the present invention, FIG. 2 shows a perspective view of a tube element in accordance with the present invention, including multiple tube segments, FIG. 3 shows an enlarged detail view of detail A of FIG. 2, and FIG. 4 shows an enlarged representation of the mounting support of a tube segment.

FIG. 1 shows a schematic representation of a gas-turbine engine in accordance with the present invention.

The gas-turbine engine 10 in accordance with FIG. 1 is an example of a turbomachine where the invention can be used. The following however makes clear that the invention can also be used in other turbomachines. The engine 10 is of conventional design and includes in the flow direction, one behind the other, an air inlet 11, a fan 12 rotating inside a casing, an intermediate-pressure compressor 13, a high-pressure compressor 14, combustion chambers 15, a high-pressure turbine 16, an intermediate-pressure turbine 17 and a low-pressure turbine 18 as well as an exhaust nozzle 19, all of which being arranged about a central engine axis 1.

The intermediate-pressure compressor 13 and the high-pressure compressor 14 each include several stages, of which each has an arrangement extending in the circumferential direction of fixed and stationary guide vanes 20, generally referred to as stator vanes and projecting radially inwards from the engine casing 21 in an annular flow duct through the compressors 13, 14. The compressors furthermore have an arrangement of compressor rotor blades 22 which project radially outwards from a rotatable drum or disk 26 linked to hubs 27 of the high-pressure turbine 16 or the intermediate-pressure turbine 17, respectively.

The turbine sections 16, 17, 18 have similar stages, including an arrangement of fixed stator vanes 23 projecting radially inwards from the casing 21 into the annular flow duct through the turbines 16, 17, 18, and a subsequent arrangement of turbine blades 24 projecting outwards from a rotatable hub 27. The compressor drum or compressor disk 26 and the blades 22 arranged thereon, as well as the turbine rotor hub 27 and the turbine rotor blades 24 arranged thereon rotate about the engine axis 1 during operation.

Reference numeral 28 designates an exhaust cone.

Furthermore, the gas-turbine engine has an inflow region 29 (annular lip), which is part of the engine cowling (nacelle) 30.

An annular tube element 31 is located next to the inflow region 29 inside the double-walled engine cowling 30, said tube element having outlet openings for passing hot air, that is introduced to it, substantially to the inner wall of the inflow region 29, in order to de-ice it.

FIG. 2 shows a tube element 31 in accordance with the invention, which includes individual tube segments 32. Each of these tube segments is supported centrally by means of a mounting support 34 on the engine cowling 30 or on structural elements inside the engine cowling 30. The individual tube segments 32 are connected to one another by means of plug-type connectors 35. These plug-type connectors 35 permit a relative movement between the individual tube segments, as is described in the following in connection with FIGS. 3 and 4.

FIG. 3 shows an enlarged representation of the region A of FIG. 2. Two adjacent tube segments 32 are shown, coupled together by a plug-type connector. This plug-type connector includes a plug-in end 36 on one of the tube segments as well as a matching socket 37 at the end region of the other adjacent tube segment 32. A sliding gasket 33 is arranged between the plug-in end 36 and the socket 37; it is annularly shaped, and is held on its radially inward side in a recess of the plug-in end 36. The sliding gasket 33 has a spherical outer contour.

FIG. 3 shows that the plug-type connector 35 allows not only a relative movement in the circumferential direction (reference numeral 38) of the tube element 31 but also a relative movement in the radial direction (reference numeral 39) and a tilting movement 40.

FIG. 4 shows an enlarged representation of a mounting support 34, which can be a bent sheet metal part. The mounting support 34 can either be joined fixedly to the tube segment 32, or can be designed to positively hold the tube segment 32.

LIST OF REFERENCE NUMERALS

1 Engine axis
10 Gas-turbine engine
11 Air inlet/inflow region
12 Fan rotating inside the casing
13 Intermediate-pressure compressor
14 High-pressure compressor
15 Combustion chambers
16 High-pressure turbine
17 Intermediate-pressure turbine
18 Low-pressure turbine
19 Exhaust nozzle
20 Guide vanes
21 Engine casing
22 Compressor rotor blades
23 Stator vanes
24 Turbine blades
26 Compressor drum or disk
27 Turbine rotor hub
28 Exhaust cone
29 Inflow region/annular lip
30 Engine cowling (nacelle)
31 Tube element
32 Tube segment
33 Sliding gasket
34 Mounting support
35 Plug-type connector
36 Plug-in end
37 Socket
38 Relative movement in the circumferential direction
39 Relative movement in the radial direction
40 Tilting movement

What is claimed is:

1. A de-icing device of an aircraft gas-turbine engine comprising:
an engine cowling enclosing at least one inflow region, the engine cowling having a double-walled design and including at least one annular tube element extending in a circumferential direction and including outlet openings for passing hot air to the at least one inflow region for de-icing the gas-turbine engine, the at least one annular tube element in the circumferential direction including multiple individual tube segments attached relative to one another in a telescopic manner to accommodate thermal expansions and contractions of the at least one annular tube element.

2. The device in accordance with claim 1, and further comprising plug connectors coupling the multiple individual tube segments to one another.

3. The device in accordance with claim 2, and further comprising sliding gaskets sealing the multiple individual tube segments from one another.

4. The device in accordance with claim 3, wherein each of the multiple individual tube segments is mounted to the gas-turbine engine at a central position along a circumferential length of the each of the multiple individual tube segments.

5. The device in accordance with claim 4, and further comprising multiple mounting supports mounting the multiple individual tube segments to the gas-turbine engine at the central positions.

6. The device in accordance with claim 1, and further comprising sliding gaskets sealing the multiple individual tube segments from one another.

7. The device in accordance with claim 6, wherein each of the multiple individual tube segments is mounted to the gas-turbine engine at a central position along a circumferential length of the each of the multiple individual tube segments.

8. The device in accordance with claim 7, and further comprising multiple mounting supports mounting the multiple individual tube segments to the gas-turbine engine at the central positions.

9. The device in accordance with claim 1, wherein each of the multiple individual tube segments is mounted to the gas-turbine engine at a central position along a circumferential length of the each of the multiple individual tube segments.

10. The device in accordance with claim 9, and further comprising multiple mounting supports mounting the multiple individual tube segments to the gas-turbine engine at the central positions.

11. The device in accordance with claim 1, wherein at least a first one and an adjacent second one of the multiple individual tube segments are telescopically connected to one another by a plug connector comprising a male plug-in end of the first one of the multiple individual tube segments positioned in a female socket end of the adjacent second one of the multiple individual tube segments.

12. The device in accordance with claim 11, and further comprising a sliding gasket positioned between the male plug-in end and the female socket end.

13. The device in accordance with claim 12, and further comprising multiple mounting supports for mounting the multiple individual tube segments to the gas-turbine engine, each of the multiple mounting supports positioned centrally with respect to one of the multiple individual tube segments along a circumferential length of the one of the multiple individual tube segments.

* * * * *